United States Patent [19]
Mochizuki

[11] 4,171,305
[45] Oct. 16, 1979

[54] BLOCKED ISOCYANATE

[75] Inventor: Kazutaka Mochizuki, Osaka, Japan

[73] Assignee: Takeda Chemical Industries, Ltd., Japan

[21] Appl. No.: 868,061

[22] Filed: Jan. 9, 1978

[30] Foreign Application Priority Data

Jan. 14, 1977 [JP] Japan ............... 52-3200

[51] Int. Cl.² ........................... C07D 223/10
[52] U.S. Cl. ............................. 260/239.3 R
[58] Field of Search .................. 260/239.3 R

[56] References Cited
U.S. PATENT DOCUMENTS 2,698,845  1/1955  Mastin et al. ............ 260/239.3 R

FOREIGN PATENT DOCUMENTS 51-25971  3/1976  Japan.
51-28825  3/1976  Japan.

Primary Examiner—John M. Ford
Assistant Examiner—Robert T. Bond
Attorney, Agent, or Firm—Wenderoth, Lind & Ponack

[57] ABSTRACT

Substantially pure crystals of ε-caprolactam-diblocked ω,ω'-diisocyanato-1,3-dimethylbenzene melting at 110° C. or higher are advantageously used as a hardener of powder coating composition.

5 Claims, 1 Drawing Figure

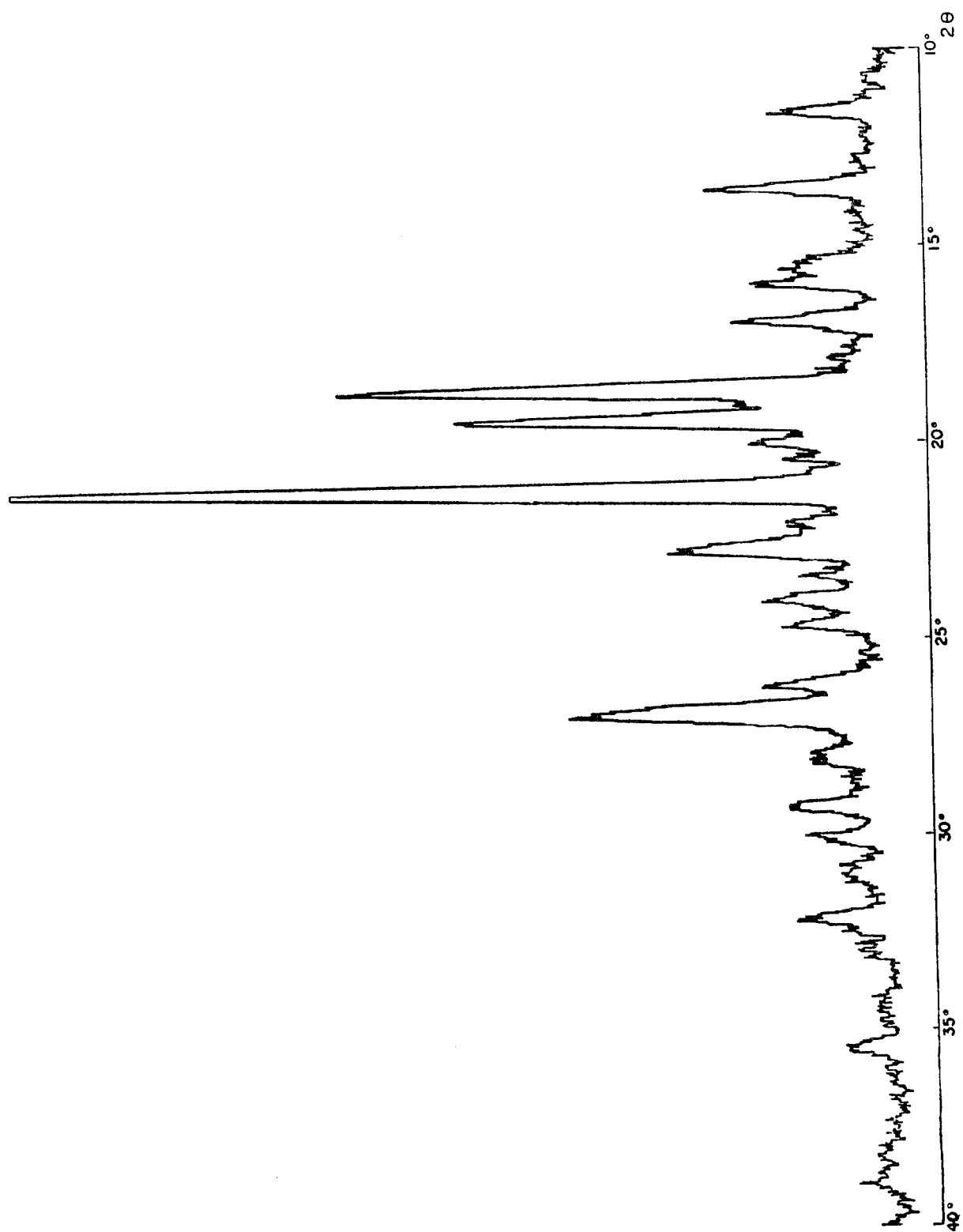

BLOCKED ISOCYANATE

This invention relates to a novel crystalline blocked isocyanate, a method for producing the same and a blocked isocyanate powder-coating composition based on said crystalline blocked isocyanate.

The use of a blocked isocyanate, that is an isocyanate compound whose isocyanate groups have been protected or blocked by a blocking agent, as a hardener in powder coating system is already known. Particularly, the use of a blocked isocyanate as blocked by ε-caprolactam as a hardener in a powder coating system is already known, for example from the disclosure in Japanese Patent Publication No. 2179/1974. However, the ε-caprolactam-blocked isocyanates so far proposed for use as hardener in powder coating systems has the disadvantages that they generally have too low melting points to assume a particulate form at room temperature or, if they could be made available in particulate forms, powder coating compositions containing such particulated isocyanates provide only poor shelf-lives, with a tendency toward caking. Under the circumstances this inventor made a thorough study of the problems and discovered that the blocked diisocyanate obtainable by blocking ω, ω'-diisocyanato-1,3-dimethylbenzene with ε-caprolactam existed in two distinct forms, i.e. a crystalline substance melting at 110° C. or higher, more concretely 110°–120° C. and an amorphous substance melting (softening) at 40°–50° C. or less. This inventor further discovered that the former crystalline blocked diisocyanate was finely divisible or comminutable and had an excellent shelf-like at room temperature, thus completely overcoming the disadvantages of the conventional blocked isocyanates as the hardener in powder coating systems. This invention, therefore, relates, in one aspect, to substantially pure crystals of ε-caprolactam-diblocked ω, ω'-diisocyanato-1,3-dimethylbenzene. The above-mentioned crystals have melting points in the range of 110°–120° C. and the crystalline nature of this product has been confirmed by this inventor on the basis of X-ray diffraction data.

The FIGURE shows X-ray diffraction pattern (Source: Cu (K$_2$) 30 KV, 15 mA S. Speed: Ginio 2/min, Chart 2 cm/min., Count Con: Scale-Multi-Time=16-1-1) of a crystal of ε-caprolactam-diblocked ω, ω'-diisocyanato-1,3-dimethylbenzene obtained in Example 2.

The crystals of ε-caprolactam-diblocked ω, ω'-diisocyanato-1,3-dimethylbenzene can be produced by the following alternative methods.

(1) A method such that the ε-caprolactam-diblocked ω, ω'-diisocyanato-1,3-dimethylbenzene is crystallized from a solution thereof. In this method, crystals are allowed to form as ε-caprolactam and ω, ω'-diisocyanato-1,3-dimethylbenzene are reacted in the presence of a solvent, or to separate out from the solution after the reaction. The reactor used for this purpose is preferably a closed vessel provided with an agitator device and such that the reaction may be conducted in an inert gaseous atmosphere to the exclusion of atmospheric moisture. As to the solvent mentioned just above, use may be made of any inert solvent free of active hydrogen, such as aromatic hydrocarbons, e.g. benzene, toluene, xylene, etc.; organic esters, e.g. ethyl acetate, butyl acetate, etc., ethers, e.g. methyl ether, ethyl ether, dioxane, etc.; ketones, e.g. acetone, methyl ethyl ketone, etc.; and so forth.

The reaction between ε-caprolactam and isocyanate is carried out normally at a temperature from 50° to 130° C. and, preferably, at a temperature between 70° C. and 90° C. The reaction may be carried out in the presence of a known catalyst which is normally employed in reactions of this type, such as tertiary amines, organometallic compounds, etc. Crystals start separating out with the progress of the reaction. Where no crystals have been formed by the end of the reaction, a poor solvent such as an aliphatic hydrocarbon is added to the reaction mixture to let crystals separate out and the resulting crystals can be harvested, for example by removing the solvent by means of a centrifugal separator, a spray dryer or other mechanical device.

(2) A method such that the ε-caprolactam-diblocked ω, ω'-diisocyanato-1,3-dimethylbenzene is allowed to stand as fused at a temperature not exceeding 100° C. and, thereby, to separate out as crystals.

In this method, ε-caprolactam and ω, ω'-diisocyanato-1,3-dimethylbenzene are fused together and reacted in the absence of a solvent to obtain a non-crystalline solid blocked isocyanate fusing at about 40°–50° C. This product crystallizes when allowed to stand as fused at a temperature not exceeding 100° C., the crystals starting separating gradually from the melt until, finally, the entire melt will become crystalline. The crystalline product thus obtained is a crop of substantially pure crystals of ε-caprolactam-diblocked ω, ω'-diisocyanato-1,3-dimethylbenzene.

The reactor as well as the reaction temperature and time which are to be employed for this fusing reaction between ε-caprolactam and ω, ω'-diisocyanato-1,3-dimethylbenzene may be substantially the same as the conditions used in the reaction in a solvent as described with reference to method (1). The fused diblocked diisocyanate thus produced would become a non-crystalline solid if it is cooled to 40° to 50° C. or less in a short period of time, for example within one hour. However, if this molten blocked diisocyanate is maintained as fused at a temperature not exceeding 100° C., crystals separate out from the melt after a few hours. The temperature suited to the precipitation of crystals is 50° to 100° C., preferably 60° to 90° C. and, for still better results, 75° to 85° C. While it depends upon the temperature of the melt, the crystallization time is not less than 5 hours and, normally, 10 to 48 hours. Addition of small amounts of crystals as seeds may promote the crystallization. Crystals would also separate out if the melt is allowed to stand, for example, at 100° to 110° C. but the rate of crystallization would then be too low.

If the reaction of ε-caprolactam with ω, ω'-diisocyanato-1,3-dimethylbenzene is conducted in the presence of a solvent as mentioned in connection with method (1), for instance, and the solvent is then quickly distilled off under reduced pressure, there are cases in which, depending upon the temperature prevailing at the operation, among other factors, a mixture of crystalline diblocked diisocyanate and non-crystalline diblocked diisocyanate is obtained. In such cases, the resultant diblocked diisocyanate (mixture) is heated to a temperature above the melting point of the crystalline blocked diisocyanate, e.g. 110° to 130° C., to prepare a homogeneous melt and this melt is allowed to stand at a temperature between about 50° C. and about 100° C., whereupon crystals separate out gradually from the melt.

The resultant substantially pure crystals of ε-caprolactam diblocked ω, ω'-diisocyanato-1,3-dimethylbenzene can be advantageously used as such or in admixture with other blocked isocyanates as blocked isocyanate powder coating systems.

The other blocked isocyanates that may be used in such mixtures may be any and all other blocked isocyanates that can be used as powder coating blocked isocyanates, such as isophorone diisocyanate, hexamethylene diisocyanate, dicyclohexylmethane diisocyanate, etc. as blocked by phenol, lactam, oxime, alcohol or other blocking agent.

The proportion of such other blocked isocyanates as may thus be employed in conjunction is preferably not more than 100 weight percent and, particularly, not more than 50 weight percent based on the blocked diisocyanate crystals of this invention.

In the production of $\epsilon$-caprolactam-diblocked diisocyanate crystals by the method of this invention where, as it may often be the case, the starting material $\omega$, $\omega'$-diisocyanato-1,3-dimethylbenzene (hereafter 1,3-compound) includes about 10 to 30 percent of $\omega$, $\omega'$-diisocyanato-1,4-dimethylbenzene (hereafter 1,4-compound) based on the total mixture, the method comprising blocking the mixture of 1,3- and 1,4-compounds as such with $\epsilon$-caprolactam and crystallizing the resultant diblocked diisocyanate mixture in the manner set forth hereinbefore yields a mixture of crystals of blocked 1,3-compound and crystals of blocked 1,4-compound. Since this mixture is almost comparable to the crystals of blocked 1,3-compound in physical properties, e.g. shelf-like, melting point, and the temperature at which the blocking groups are removed, it can be used with advantage in blocked isocyanate powder coating compositions just as the blocked 1,3-compound as such.

The blocked 1,3-compound as it is or a powder coating blocked isocyanate composition containing it as a predominant component is capable of giving a powder coating composition with excellent shelf-like and film-forming properties when amixed with a polyol resin having a melting point not less than 40° C. and a deblocking catalyst.

As the polyol resins having melting points over 40° C., there may be mentioned polyester resins, acrylic polyol resins, epoxy resins, polyether resins, hydrolyzed ethylene-vinyl ester copolymer, etc. as well as mixtures of such resins. Particularly desirable are hydrolyzed ethylene-vinyl ester copolymer, polyester resins and acrylic polyol resins. As the polyester resins, there may be mentioned the resins obtained by the conventional condensation of a polybasic acid such as phthalic acid, isophthalic acid or terephthalic acid with a polyol such as ethylene glycol, neopentyl glycol, trimethylolpropane or the like with an excess of hydroxyls. Preferred polyester resins are those with molecular weights in the range of 500 to 4000, preferably from 1000 to 3000, a hydroxyl value of 10 to 300, preferably from 20 to 200, an acid value of 1 to 30 and a melting point in the range of 60° to 120° C.

As the acrylic polyol resins, there may be mentioned the resins obtained by copolymerizing (1) a hydroxyl-containing monomer such as 2-hydroxyethyl acrylate, 2-hydroxypropyl acrylate, 2-hydroxyethyl methacrylate or 2-hydroxypropyl methacrylate with (2) a monomer such as methyl acrylate, butyl acrylate, ethyl methacrylate, propyl methacrylate, styrene, vinyltoluene, vinyl acetate, acrylonitrile or acryl acetate. Such acrylic polyol resins should normally have hydroxyl values in the range of 10 to 300 and, preferably, 20 to 200. The melting points of such resins are 40° to 150° C., preferably 60° to 120° C.

As the epoxy resins, there may be mentioned those resins which contain at least two hydroxyl groups per molecule and, normally, are condensed-epoxy resins obtainable by reacting bisphenol A with epichlorohydrin. Preferred are such resins with epoxy equivalents of 425 to 10,000 and, for still better results, 425 to 4,000. The melting points of such epoxy resins may range from 40° to 200° C., preferably, from 60° to 150° C.

The hydrolyzed ethylene-vinyl ester copolymer may be prepared, for example, by copolymerizing ethylene and a vinyl ester monomer in a conventional manner (e.g. as disclosed in the Specifications of U.S. Pat. Nos. 2,200,429 and 2,703,794) and, then, hydrolyzing the resultant copolymer in a conventional manner (e.g. as disclosed in the Specification of U.S. Pat. No. 2,386,347) according to the following reaction sheme:

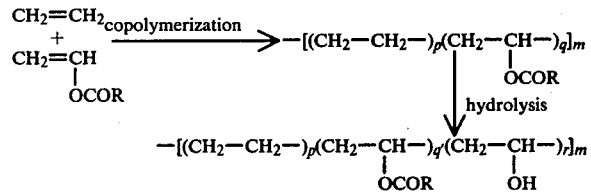

(where R is a lower alkyl radical of 1 to 6 carbon atoms and p, q, q', r and m are numbers).

Examples of the vinyl ester monomer include vinyl acetate, vinyl propionate, vinyl butyrate and vinyl benzoate. In the above, the content of ethylene units $(p/(p+q)\times 100)$ is preferably more than 50 mole percent. If the ethylene content is less, the melt viscosity of the system is reduced, sometimes to the extent that coats with a satisfactory appearance cannot be obtained. The content of vinyl alcohol units $(r/(p+q)\times 100, q'+r=q)$ is preferably more than 5 mole percent. If the vinyl alcohol content is too low, the effect of cross-linking or cure by the blocked organic polyisocyanate will be insufficient so that, sometimes, the coating will note have such a high abrasion resistance as it would otherwise. A particularly desirable composition is one consisting of 70 to 95 mole percent of ethylene $(p/(p+q)\times 100)$, 0 to 25 mole percent of vinyl ester $(q'/(p+q)\times 100)$ and 5 to 25 mole percent of vinyl alcohol $(r/(p+q)\times 100)$, for instance. The melt index of this hydrolyzed copolymer is preferably in the range of 1 to 1000, particularly from 10 to 500. In place of the hydrolyzed ethylene-vinyl ester copolymer, a carboxyl-modified derivative of the aforesaid hydrolyzed copolymer may likewise be employed. The carboxyl-modified derivative can be produced, for example by reacting said hydrolyzed copolymer with a carboxyl-containing unsaturated compound or a cyclic acid anhydride in a conventional manner.

As the deblocking catalyst for removal of the protective group from the blocked isocyanate, one of the distannoxane compounds of the following general formula (I), the melting points of which are not less than 40° C., can for example be used with particular advantage.

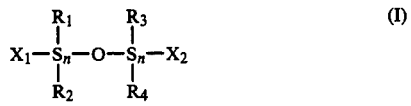

(wherein $R_1$, $R_2$, $R_3$ and $R_4$ are the same or different and each represents an alkyl group; $X_1$ and $X_2$ are the same or different and each represents halogen, hydroxyl, alkoxy or acyloxy).

Referring to the compounds represented by the above general formula (I), each of $R_1$, $R_2$, $R_3$ and $R_4$ is an alkyl group such as methyl, ethyl, propyl, isopropyl, butyl, tert-butyl, pentyl, hexyl, lauryl, myristyl, cyclohexyl or cyclopentyl. The symbol X means a halogen atom such as chlorine, bromine or iodine; isocyano; hydroxyl, or alkoxy (e.g. methoxy, ethoxy, propoxy, isopropoxy, butoxy, hexoxy, etc.); saturated or unsaturated acyloxy, whether aliphatic, aromatic or otherwise (e.g. formyloxy, acetyloxy, propionoyloxy, butyroyloxy, acryloxy, phenylacetoxy, cyanoacetoxy, stearyloxy, salicyloxy, oleyloxy, etc.).

As examples of the distannoxane compounds having melting points not lower than 40° C., which have the above general formula (I), there may be mentioned the compounds mentioned in Japanese Patent Publication No. 12405/1967, such as 1,1,3,3-tetra-n-butyl-1,3-diacetoxydistannoxane, tetra-n-propyl-1,3-diacetoxydistannoxane, tetra-n-propyl-1-chloro-3-hydroxydistannoxane, tetramethyl-1,3-diacetoxydistannoxane, tetramethyl-1-chloro-3-acetoxydistannoxane, tetra-n-butyl-1-acetoxy-3-hydroxydistannoxane, tetra-n-propyl-1-acetoxy-3-hydroxydistannoxane, tetramethyl-1-acetoxy-3-hydroxydistannoxane, tetra-n-butyl-1,3-dichlorodistannoxane, tetramethyl-1,3-dichlorodistannoxane, tetra-n-butyl-1-propoxy-3-acetoxydistannoxane, 1,1-dibutyl-3,3-dipropyl-1-hydroxy-3-acetoxydistannoxane, 1,3-dipropyl-1,3-dibutyl-1-chloro-3-hydroxydistannoxane, etc.

The amount of such distannoxane compound is about 0.01 to 10% and, preferably, about 0.1 to 5% based on the weight of the blocked diisocyanate.

The mixing ratio of blocked diisocyanate to polyol resin is desirably adjusted so that the equivalent ratio of blocked isocyanate groups to hydroxyl groups (NCO/OH) will be about 0.5 to 2.0 or, preferably, 0.6 to 1.25.

To produce a composition suited for powder coating from the blocked diisocyanate crystals or powder coating blocked diisocyanate composition of this invention, a polyol resin component and a deblocking catalyst, all that is necessary is to comminute each of them to a size between 5 to 500 microns, preferably between about 10 to 300 microns and to mix them. The powder coating composition thus obtained will not cake or gel but remain stable during storage. Coats from this composition can be baked at low temperature and the resultant films will not be scorched or blistered, presenting a flat smooth surface with excellent physical and weathering properties. Thus, it is very useful as a powder coating composition.

This invention will be further described in detail by way of examples, in which all parts and percents are by weight.

EXAMPLE 1

A reactor equipped with agitator and reflux means was charged with 470 parts of ω,ω'-diisocyanato-1,3-dimethylbenzene, 260 parts of ethyl acetate and 0.2 part of 1,1,3,3-tetra-n-butyl-1,3-diacetoxydistannoxane and, while the temperature was maintained at 70°–75° C., 577 parts of molten ε-caprolactam was continuously fed in nitrogen streams.

The reaction was conducted at 70°–75° C., whereupon crystals were formed throughout the system to give a suspension, with the free isocyanate content of the reaction mixture having been reduced to no more than 0.1%. Then, at a reduced pressure of 50 mmHg and at a temperature of about 80° C., the ethyl acetate was distilled off. By the above procedure was obtained a blocked diisocyanate as crystals melting at 110°–120° C.

EXAMPLE 2

A reactor equipped with an agitator and a heated dropping funnel was charged with 94 parts of ω,ω'-diisocyanato-1,3-dimethylbenzene and 0.04 part of dibutyltin dilaurate and, while the temperature was maintained at 75°–80° C., 115 parts of molten ε-caprolactam was continuously fed in nitrogen streams through the funnel. The reaction was conducted at 75°–80° C. for 5 hours, whereby the free isocyanate content of the system was reduced to no more than 0.1%. Thereafter, the temperature was increased to 110°–120° C. and the contents were withdrawn from the reactor. This blocked diisocyanate was maintained at 75°–85° C. for 20 hours, whereupon the entire system crystallized to yield blocked diisocyanate crystals melting at 110°–120° C.

EXAMPLE 3

A reactor equipped with agitator and reflux means was charged with 33 parts of ω,ω'-diisocyanato-1,3-dimethylbenzene, 14 parts of ω,ω'-diisocyanato-1,4-dimethylbenzene, 58 parts of ε-caprolactam and 35 parts of ethyl acetate and the reaction was conducted at 70° C. for 5 hours. Thereupon, crystals separated out in the reaction mixture to yield a suspension, with the free NCO content being reduced to no more than 0.1%. Thereafter, at 80° C. and a reduced pressure of 50 mmHg, the ethyl acetate was distilled off. By the above procedure was obtained a mixture of blocked isocyanates (1.3-:70%; 1,4-:30%) melting at 100°–120° C.

REFERENCE EXAMPLE 1

388 parts of dimethyl terephthalate, 312 parts of neopentyl glycol and 40 parts of trimethylolpropane were reacted at 180°–200° C. for 4 hours, the byproduct methanol being continuously expelled from the system. This was followed by the addition of 148 parts of phthalic anhydride and the reaction was further continued at 240° C. with the removal of byproduct water for 4 hours. By the above procedure was obtained a polyester resin with an acid value of 5.0, a hydroxyl value of 67.0 and a melting point of 90°–100° C.

In a Henschel mixer, 210 parts of the blocked diisocyanate of Example 3, 840 parts of the above polyester resin (NCO/OH=1.0), 525 parts of titanium oxide, 5 parts of Modaflow® and 3 parts of 1,1,3,3-tetra-n-butyl-1,3-diacetoxydistannoxane were blended to homogeniety for 15 minutes. This mixture was finely divided in an atomizer to particle diameters not exceeding 100μ. The particulate composition was applied electrostatically to a steel pannel at 60 KV so as to give a film from 80 to 100μ in thickness and baked at 140° C. for 30 minutes. By the above procedure was obtained a tough, glossy and white film.

REFERENCE EXAMPLE 2

40.5 Parts of dimethyl terephthalate, 32.0 parts of neopentyl glycol and 0.03 part of lead oxide were reacted at 180° C. for 5 hours, the byproduct methanol being continuously expelled from the reaction system. Then, 30.7 parts of isophthalic acid 16.0 parts of octanediol and 0.005 part of tin octylate were added and the reaction was conducted at 220° C. for 14 hours. By this procedure was obtained a polyester resin with an acid value of 3.5, a hydroxyl value of 26 and a melting point of 96° C.

216 parts of the above polyester resin, 21 parts of the blocked diisocyanate of Example 2 (NCO/OH=1.0), 120 parts of titanium oxide, 1 part of Modaflow ® and 0.5 part of tetramethyl-1-chloro-3-acetoxydistannoxane were comminuted as in Reference Example 1 and resultant powder was applied electrostatically to a steel pannel at 60 KV to give a film from 80 to 100μ in thickness and baked at 140° C. for 30 minutes. By the above procedure was obtained a tough, glossy and white film.

REFERENCE EXAMPLE 3

210 Parts of the blocked isocyanate of Example 1, 320 parts of epoxy resin (Epikote ® 1004, Shell Chemical; epoxy equivalent 1000 approx., m.p. 95°–104° C.XNCO/OH=1.0), 265 parts of titanium oxide, 2 parts of Modaflow ® and 1 part of 1,1,3,3-tetra-n-butyl-1,3-diacetoxydistannoxane were finely divided as in Reference Example 1. The resultant powdery composition was applied electrostatically to a steel pannel at 60 KV to give a film as thick as 80–100μ and baked at 140° C. for 30 minutes. By the above procedure was obtained a tough glossy and white film.

REFERENCE EXAMPLE 4

By a procedure similar to that described in Reference Example 1, 660 parts of an acrylic polyol with a melting point of 77°–84° C. and a hydroxyl value of 85 which was obtained by copolymerizing 50 parts of styrene, 30 parts of n-butyl acrylate and 20 parts of 2-hydroxyethyl methacrylate in the conventional manner were comminuted together with 210 parts of the blocked isocyanate of Example 2(NCO/OH=1.0), 435 parts of titanium oxide, 4 parts of Modaflow ® and 2 parts of 1,1,3,3-tetrapropyl-1,3-diacetoxydistannoxane. The resulting particulate composition was applied electrostatically to a steel pannel at 60 KV so as to give a film from 80 to 100μ in thickness and baked at 140° C. for 30 minutes. By the above procedure was obtained a tough, glossy and white film.

REFERENCE EXAMPLE 5

By a procedure similar to that described in Reference Example 1, 100 parts of a graft-modified polymer prepared by grafting 0.3 weight percent of acrylic acid to a hydrolyzed ethylene-vinyl acetate copolymer with an ethylene content of 88.8 mole percent and vinyl alcohol content of 8.9 mole percent, 53 parts of blocked isocyanate of Example 2 (NCO/OH=1.0) and 60 parts of titanium oxide were pulverized. The resulting particulate composition was applied electrostatically to a steel pannel at 60 KV so as to give a film from 80 to 100μ in thickness and baked at 140° C. for 30 minutes. By the above procedure was obtained a tough, glossy and white film.

CONTROL EXAMPLE 1

84 Parts of hexamethylene diisocyanate, 115 parts of ε-caprolactam and 70 parts of ethyl acetate were reacted at 70° C. for 8 hours, whereby the free isocyanate content was reduced to no more than 0.1%. The ethyl acetate was distilled off at 80° C. and at a reduced pressure of 50 mmHg to recover a blocked isocyanate. 200 Parts of this blocked isocyanate, 840 parts of the polyester resin of Reference Example 1 (NCO/OH=1.0), 520 parts of titanium oxide and 5 parts of Modaflow ® were pulverized by a procedure similar to that described in Reference Example 1 and the resultant composition was applied electrostatically to a steel pannel at 60 KV to obtain a film as thick as 80–100μ and baked at 140° C. for 30 minutes. By this procedure was obtained a white film.

CONTROL EXAMPLE 2

111 Parts of isophorone diisocyanate, 113 parts of ε-caprolactam and 75 parts of ethyl acetate were reacted at 70° C. for 8 hours, whereby the free isocyanate content was reduced to no more than 0.1%. The ethyl acetate was distilled off at 80° C. and at a reduced pressure of 50 mmHg to recover a blocked isocyanate. 224 parts of this blocked isocyanate, 840 parts of the polyester resin of Reference Example 1(NCO/OH=1.0), 530 parts of titanium oxide and 5 parts of Modaflow ® were finely divided by a procedure similar to that described in Reference Example 1 and the resultant powdery composition was applied electrostatically to a steel pannel at 60 KV to obtain a film from 80 to 100μ in thickness and baked at 140° C. for 30 minutes. By the above procedure was obtained a white film.

CONTROL EXAMPLE 3

A reactor equipped with an agitator and a heated dropping funnel was charged with 94 parts of ω,ω'-diisocyanato-1,3-dimethylbenzene and 0.04 part of dibutyltin dilaurate and, while the temperature was maintained at 75°–80° C., 115 parts of molten ε-caprolactam was continuously fed in nitrogen stream through the funnel. The reaction was conducted at 75°–80° C. for 5 hours, whereby the free isocyanate content of the system was reduced to no more than 0.1%. Thereafter, the temperature was raised to 110°–120° C. and the contents were withdrawn from the reactor. This blocked diisocyanate was kept standing at room temperature over 10 hours. The blocked diisocyanate was in the form of amorphous substance melting at 40°–50° C. 210 Parts of this blocked diisocyanate, 840 parts of the polyester resin of Reference Example 1 (NCO/OH=1.0), 525 parts of titanium oxide, 5 parts of Modaflow ® and 3 parts of 1,1,3,3-tetra-n-butyl-1,3-diacetoxydistannoxane were pulverized by a procedure similar to that described in Reference Example 1 and the resultant composition was applied electrostatically to a steel pannel at 60 KV to obtain a film as thick as 80–100μ and baked at 140° C. for 30 minutes. By this procedure was obtained a white film.

The following Table 1 shows the comparative date of shelf-life of the powder coating compositions as well as those of the properties of films so applied.

Table 1

|  | Ref. Ex. 1 | Ref. Ex. 2 | Ref. Ex. 3 | Ref. Ex. 4 | Ref. Ex. 5 | Cont. Ex. 1 | Cont. Ex. 2 | Cont. Ex. 3 |
|---|---|---|---|---|---|---|---|---|
| Shelf life of powders, 40° C. 2 weeks | No abnormality | No abnormality | No abnormality | No abnormality | No abnormality | Caked | Caked | Caked |
| Bake temperature | 140° C. | 140° C. | 140° C. | 140° C. | 140° C. | 140° C. | 140° C. | 140° C. |
| Appearance of film | Good | Good | Good | Good | Good | Bad | Bad | Poor |
| Gloss (60°-mirror reflection) | 98 | 97 | 96 | 98 | 95 | 80 | 82 | 95 |
| Hardness (Pencil) | H | H | F-H | 2H | F | F | F | H |
| Bending test, 10 mm φ* | Pass | Pass | Pass | Pass | Pass | Fail | Fail | Pass |
| Erichsen test | 8mm | 8mm | 7mm | 8mm | 8mm | Not more than 1mm | Not more than 1mm | 7 mm |
| Solvent resistance (ethyl acetate)* | Pass | Pass | Pass | Pass | Pass | Fail | Fail | Pass |
| Sunshine weather-o-meter after 500 hrs. of exposure — Gloss | 91 | 90 | 83 | 92 | 88 | Not more than 50 | Not more than 50 | 90 |
| Sunshine weather-o-meter after 500 hrs. of exposure — ΔE | 1.3 | 1.5 | 3.0 | 1.2 | 1.7 | 5.0 | 4.5 | 1.5 |

*In accordance with JIS-K-5400

What is claimed is

1. Substantially pure crystals of ε-caprolactam-diblocked ω,ω'-diisocyanato-1,3-dimethylbenzene, said crystals melting at 110° C. or higher.

2. A method of producing substantially pure crystals of ε-caprolactam-diblocked ω,ω'-diisocyanato-1,3-dimethylbenzene, said crystals melting at 110° C. or higher, which comprises crystallizing ε-caprolactam-diblocked ω,ω'-diisocyanato-1,3-dimethylbenzene from a solution thereof or allowing said compound to stand as fused at a temperature not exceeding 100° C.

3. A method as claimed in claim 2, wherein ε-caprolactam-diblocked ω,ω'-diisocyanato-1,3-dimethylbenzene is allowed to stand as fused at a temperature ranging 50° to 100° C.

4. A method as claimed in claim 2, wherein ε-caprolactam-diblocked ω,ω'-diisocyanato-1,3-dimethylbenzene is allowed to stand as fused at a temperature ranging 60° to 90° C.

5. A method as claimed in claim 2, wherein ε-caprolactam-diblocked ω,ω'-diisocyanato-1,3-dimethylbenzene is allowed to stand as fused at a temperature ranging 75° to 85° C.

* * * * *